United States Patent [15] 3,681,537

Eddy et al. [45] Aug. 1, 1972

[54] MARKER FOR COMMUNICATION SWITCHING SYSTEM

[72] Inventors: John W. Eddy, Villa Park; Harold G. Fitch, Clarendon Hills; Wing F. Mui, Chicago; Angelo M. Valente, Brookfield, all of Ill.

[73] Assignee: GTE Automatic Electric Laboratories Incorporated, Northlake, Ill.

[22] Filed: April 1, 1971

[21] Appl. No.: 130,418

[52] U.S. Cl. ....................179/18 GE
[51] Int. Cl. ....................H04q 3/42
[58] Field of Search ....................179/18 GE

[56] References Cited

UNITED STATES PATENTS 3,293,368 12/1966 Wedmore ....................179/18 GE
3,349,189 10/1967 Van Bosse ....................179/18 GE
3,549,815 12/1970 Bruglemans ....................179/18 GE

*Primary Examiner*—Kathleen H. Claffy
*Assistant Examiner*—William A. Helvestine
*Attorney*—B. E. Franz, Kurt Mullerheim and Theodore C. Jay, Jr.

[57] ABSTRACT

The disclosure relates to a switching network and marker used in a communication switching system. The network comprises a plurality of coordinate matrices with reed relay crosspoint switching devices. The marker is of a wired logic solid state type utilizing reed relays for connecting it to the matrices. The same terminating marker is used for controlling both the line and selector matrices in completing a call.

7 Claims, 8 Drawing Figures

INVENTORS
JOHN W. EDDY
HAROLD G. FITCH
WING F. MUI
ANGELO M. VALENTE

BY Bernard E. Franz
ATTORNEY

MARKER FOR COMMUNICATION SWITCHING SYSTEM

BACKGROUND OF THE INVENTION

1. Field of the Invention

This invention relates to a marker for a communication switching network, and more particularly to a marker pathfinding arrangement for a crosspoint switching network.

2. Description of the Prior Art

Markers which have been provided for crosspoint switching networks of the type generally disclosed in U.S. Pat. No. 3,275,752 utilize a three step pathfinding arrangement as disclosed in U.S. Pat. No. 3,293,368. These three steps are: the primary step of completing a path from an originating station through the matrix stages of a portion of the network by an originating marker to an intermediate point usually a junctor. A path is subsequently established through this originating junctor to a register-sender which is arranged to accept called line information. The secondary step of group selection via group selection matrices is performed by a group selector marker in response to a call by the register-sender. These matrices are controlled to connect the originating junctor through the selection matrices as directed by the register-sender data to an available group selector outlet to which is connected a terminating junctor.

The tertiary step is that of completing the connection from a terminating junctor via the matrices to the called line terminal by the originating marker. The originating or line group marker is controlled by the called line data received from the register-sender. The line group matrices are then scanned by this marker in an attempt to find a path between the terminating junctor and the desired line terminal. This is not always possible since the links interconnecting these two matrix terminals may be in use and therefore unavailable for this particular call. It therefore becomes necessary to have the group selector marker select a path to another available terminating junctor to the called line terminal. As is obvious this results in a delay in the completion of the call as well as an increase in the use of the common exchange equipment, the markers and register-senders.

SUMMARY OF THE INVENTION

Accordingly it is an object of this invention to provide an improved marker system wherein only a single marker operation will complete a path from an originating junctor to the called line terminal.

The purpose of path selection is to find an idle path from a specific selector inlet to a specific line inlet. This path includes the A, B and C stages of the selector matrix, a terminating junctor and the A, B and C stages of the line matrix.

The market tests the 5 AB links between the line matrix A and B stages that are available to the line inlet for their busy or idle status. There are 4 line matrix BC links associated with each of the 5 AB links available to the line inlet. A busy AB link will cause the marker to consider the associated 4 BC links as busy, regardless of their true status. Each BC link is associated with one line matrix C unit, which has at most 6 terminating junctors connected to it. If the marker finds a BC link idle, it turns on an idle test potential to the terminating junctors connected to the associated C unit. A maximum of 120 terminating junctors could be thus enabled. This potential goes through a normally closed relay contact in the terminating junctor to the terminating junctor's idle test load. If the terminating junctor is busy, the contact is open, so that the potential does not reach the idle test load. The marker thus applies a potential to each terminating junctor which has an idle path from it through the 3 line matrix stages to the line inlet. Some or all of these terminating junctors are wired to a known group of outlets on the desired selector matrix.

There are 10 AB links between the selector matrix A and B stages that are available to the selector inlet. There are 8 selector matrix BC links associated with each selector matrix AB link. Each selector matrix BC link is associated with one C unit. Each C unit is associated with one idle test lead of the known group of outlets mentioned above. There is an intermediate distributing frame here which obscures the identity of the terminating junctor relative to the C stage of its selector matrix. This is a factor that complicates the scan operation. The marker then scans the 80 possible combinations of selector matrix AB links, selector matrix BC links and the idle test leads. If the marker finds an idle combination, it is known that this combination represents an idle path from the selector inlet to the line inlet. The marker then builds a correed (reed relay) "tree" to the selector matrix outlet as defined by the position of the scanner. This provides a connection to apply ground to operate the selector matrix crosspoint correeds. The marker then applies a ground to the idle test lead of the selected path; this operates a relay in the terminating junctor which completes a connection from the marker through the selected terminating junctor to the line matrix C stage outlet to which the terminating junctor is wired. This connection is used to apply ground to operate the line matrix crosspoint correeds.

The terminating junctors serve to connect the selector and line matrix since they are wired to the outlets of both.

DESCRIPTION OF THE PREFERRED EMBODIMENT

Line Group

Figure 2:
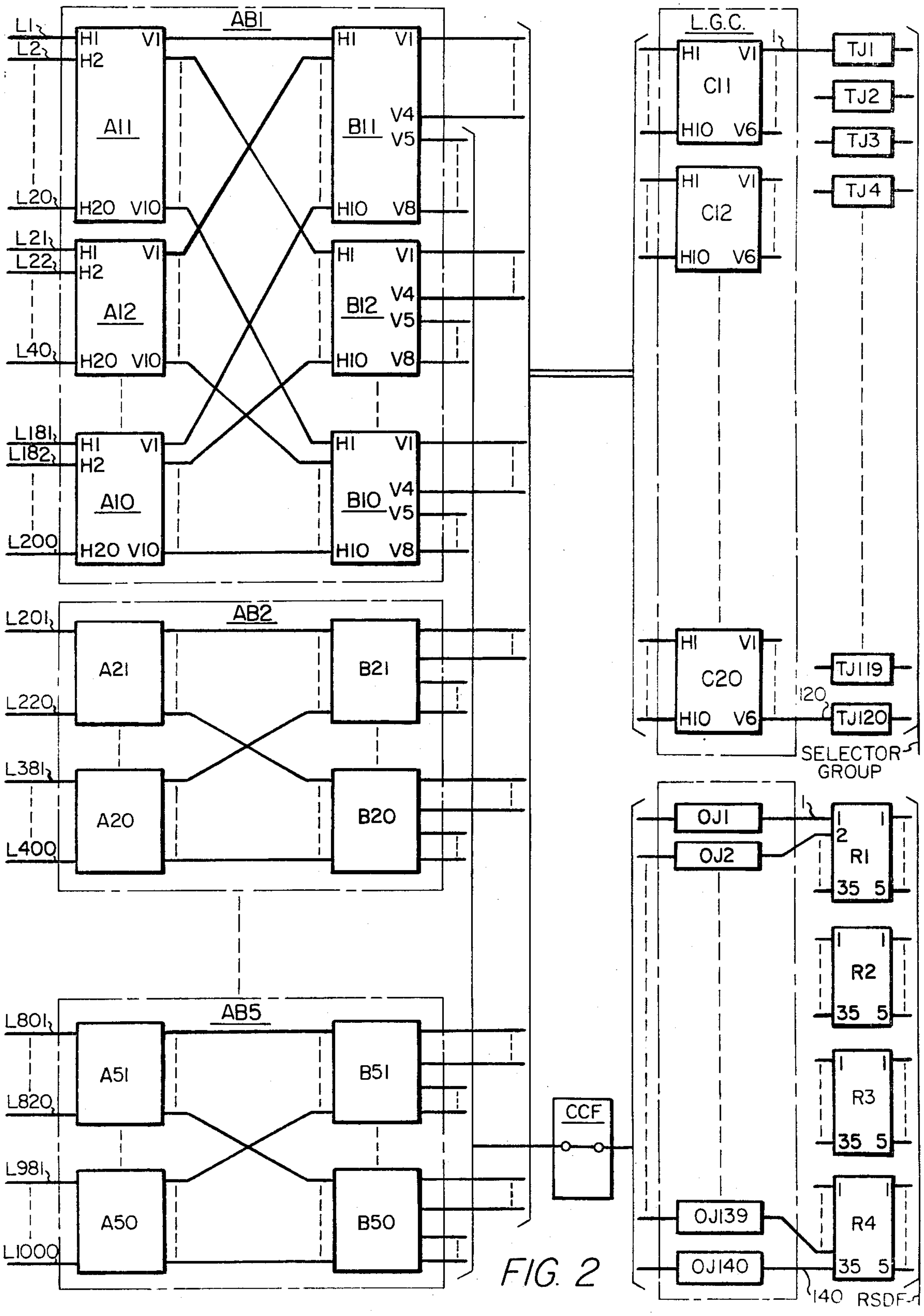
FIG. 2 shows the arrangement and interconnection of the switching stages of the line group.

The line group shown in FIG. 2 is divided into the following groupings for each 1,000 lines: five AB groups and associated line circuits AB1–AB5; one C group LGC and terminating junctors TJ1-TJ120; and one R group R1–R4 and originating junctors OJ1–OJ140. The AB groups are arranged with the line circuits, the connect and access circuits, and the A and B matrix cards. Each line equipment card is for ten lines whose traffic is applied to all A units of the AB group. The A unit (20 inlets, 10 outlets) concentrates the traffic from twenty lines L1–L20 and applies it to all B units of the AB group.

Each AB group provides inlets for 200 lines. An AB group is an entity of ten A matrix units A11–A10 and ten B matrix units B11–B10. Each A matrix unit has 20 inlets for subscriber's lines, and 10 outlets. A matrix unit in a switching matrix may be a full-availability switch; that is, each inlet has access to all outlets so that a matrix unit has a full complement of crosspoints which, in number, equals the product of the number of inlets and the number of outlets. The A matrix unit in the line matrix AB group here disclosed is a limited-availability switch. Each of the 20 inlets can access only 5 of the 10 outlets. Therefore, an A matrix unit is equipped with only 100 crosspoints instead of a complement of 20 × 10 or 200 crosspoints.

Figure 3:
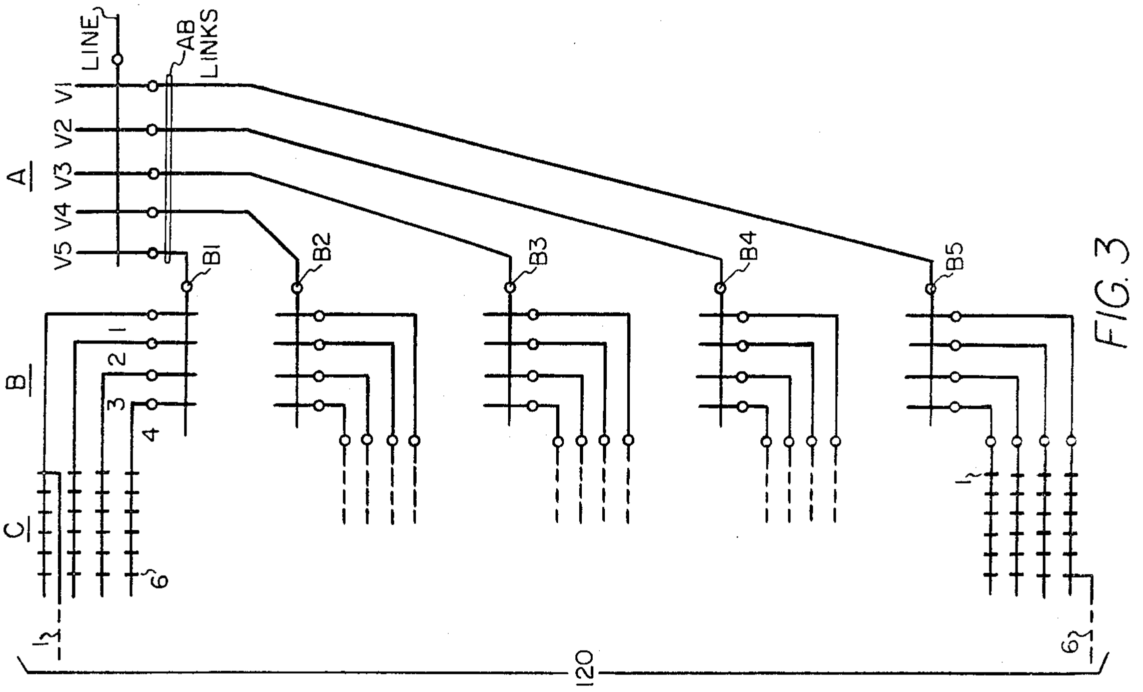
FIG. 3 shows the fan out of the links from a single line terminal.

Each B matrix unit has 10 inlets and 8 outlets. AB-links connect the A matrix unit outlets to the B matrix unit inlets. Each A matrix unit is connected to each B matrix unit by one AB link. The eight outlets of a B matrix unit are separately assigned to handle originating calls and terminating calls. The first four outlets are assigned for connection to originating junctors via a cross-connect field CCF. The remaining four outlets are assigned for connection to C matrix units in the C stage through BC-links. A fan out of the paths available from a line to a terminating junctor is shown on FIG. 3.

Each line has access to only five B matrix units; also no line has access to more than one of each of the following pairs of B matrix units: 1 and 6, 2 and 7, 3 and 8, 4 and 9, and 5 and 10.

Two consequences of the crosspoint arrangement in the A matrix unit are: (a) each customer has access to 40 out of the 80 B-stage outlets, of which 20 are used for connection to originating junctors and 20 are connected to C matrix units; and (b) the ten B matrix units are arranged into five unique pairs where any customer has access to one of each pair of B matrix units.

The C group and terminating junctors are equipped in one group. This group contains twenty C matrix units C11–C20 and up to a maximum of 120 terminating junctors TJ1–TJ120. Each C matrix unit has 10 inlets H1–H10 and six outlets V1–V6, and can connect a maximum of six terminating junctors to two B matrix unit outlets in each of the five AB groups in the line matrix. BC-links connect the paired C matrix unit inlets to two B matrix units in the AB group. The association of the two B matrix units with a pair of C matrix unit inlets reflects the pairings of B matrix units generated by the arrangement of cross-points in the A matrix units.

The R group is arranged with originating junctors OJ1–OJ140, R matrix cards R1-R4, and a grading panel. The R stage contains four R matrix units. Each matrix unit has 5*n* inlets (where *n* can have a maximum value of 7) and 5 outlets. One R stage is provided per line matrix. The number of inlets per R matrix unit is determined by the number of originating junctors which must be provided for the line matrix. Originating junctors connect B matrix units and R matrix units in such a way that all four R matrix units are connected to outlets of each B matrix unit. Each R matrix unit can connect any one of 35 originating junctors to any one of five register junctors in the register-sender group.

SELECTOR GROUP

Figure 1:
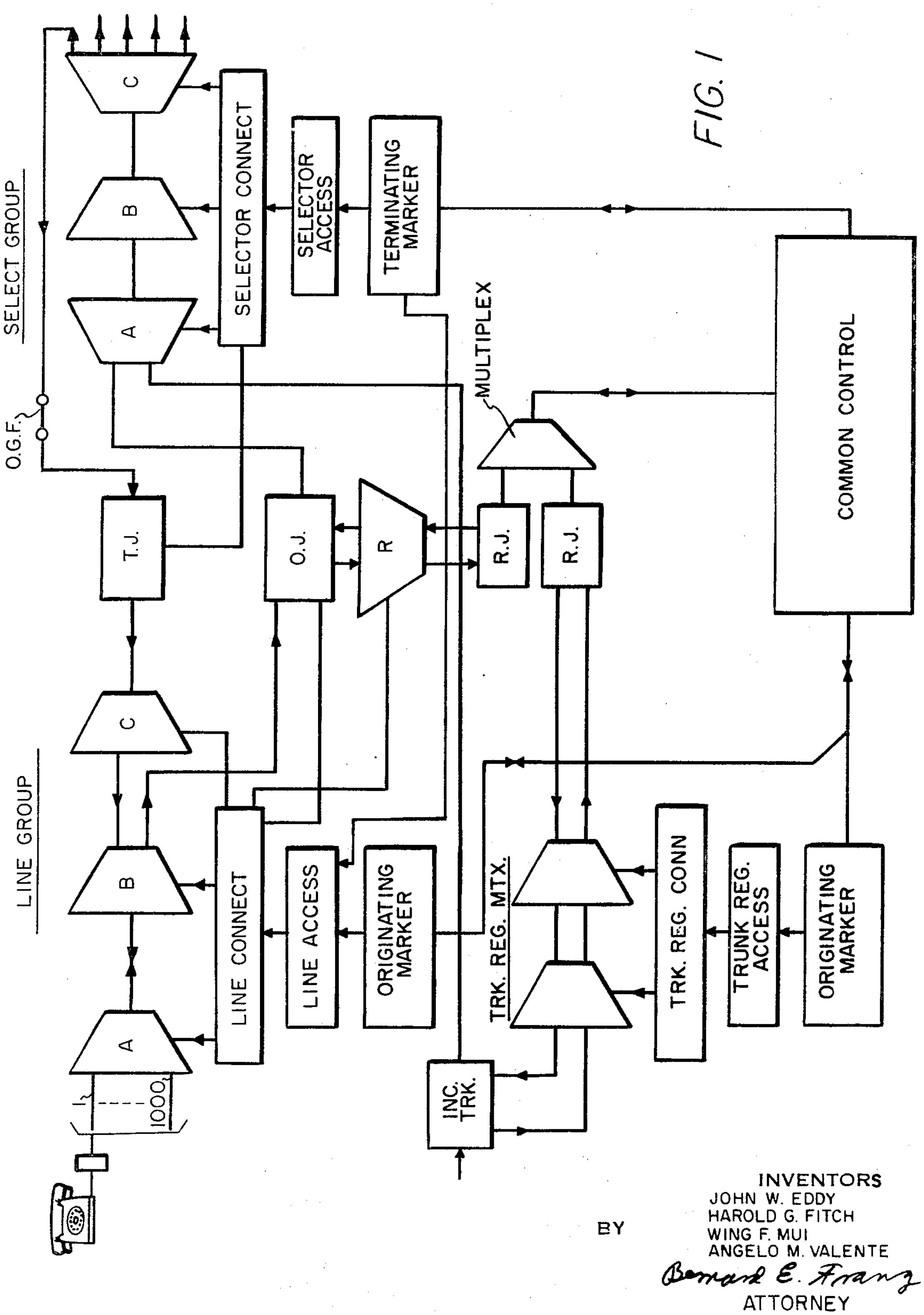
FIG. 1 is a block diagram of a telephone switching exchange.

As FIG. 1 illustrates, the selector group consists of two main items: the selector matrix A stage, B stage, and C stage to provide the signaling and transmission paths and the connect and access equipment by which the terminating marker can control the selector group. FIG. 1 also shows the way in which these items are interconnected with each other and with other subsystems.

Figure 4:
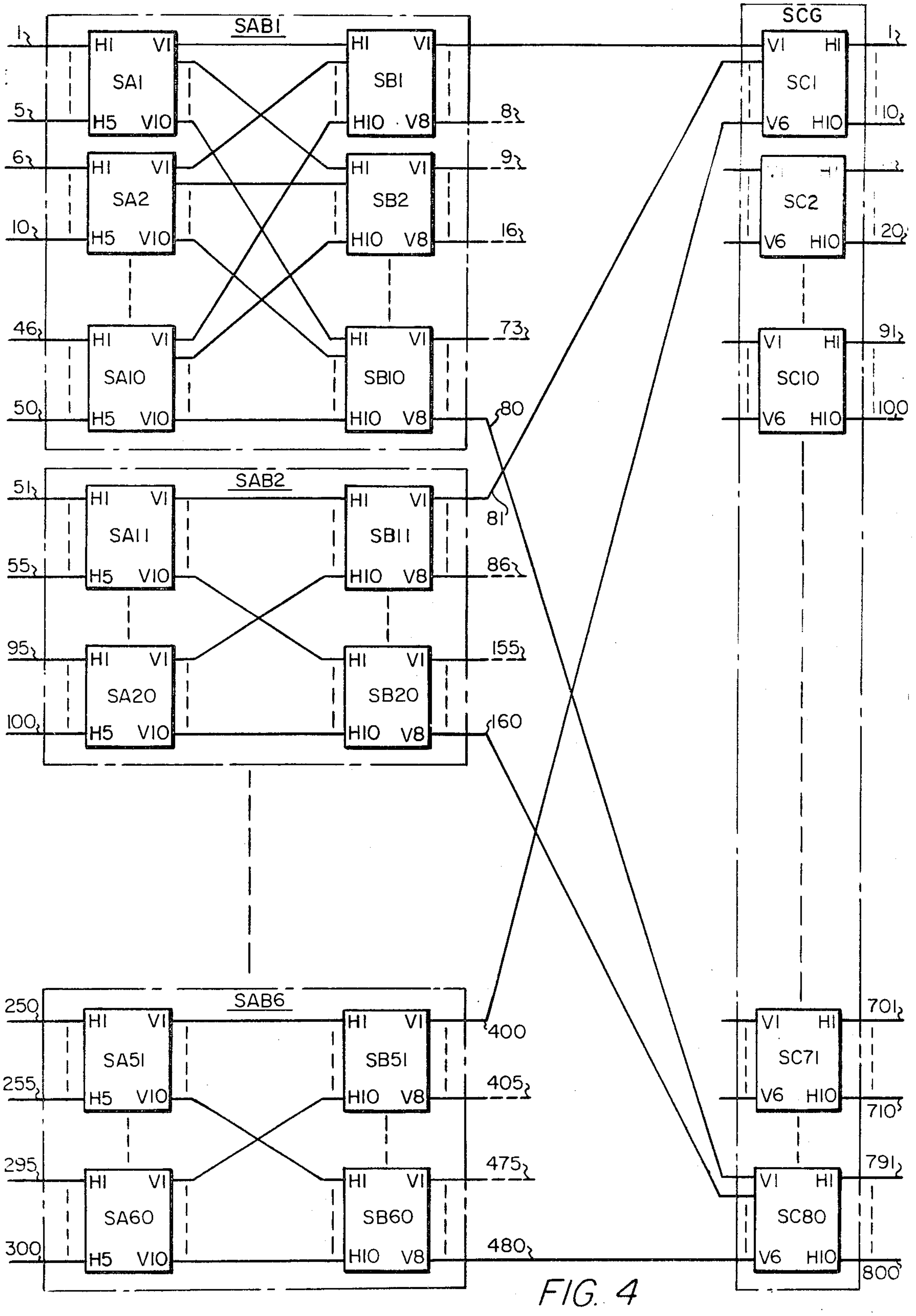
FIG. 4 shows the arrangement and interconnection of the switching stage of the line group.

The selector matrix shown in greater detail in FIG. 4, comprised of switching stages A, B, and C, is a three-stage network. The function of this three-stage network is to interconnect originating junctors, incoming trunks, and special local facilities with terminating junctors, outgoing trunks, intertoll, toll terminating, and special local facilities.

The A stage is an expansion stage consisting of 60 A matrix units SA1–SA60 (5 × 10 cards). Collectively these 60 A units provide 300 inlets for originating junctors, incoming trunk circuits, and special local facilities. Also these 60 A units provide 600 outlets to the B stage.

Each A unit is a fully available 5 × 10 matrix, packaged on one printed wiring card. FIG. 4 shows that an A unit (5 × 10) is a fully available matrix fabricated on one A card. The selector matrix A stage consists of 60 such cards (60 A units) to accommodate 300 inlets.

The B stage is a concentration stage consisting of 60 B matrix units SB1–SB60 (10 × 8 cards). The B stage provides 600 links (inlets) from the A stage (AB links) and 480 outlets to the C stage (BC links).

Each B unit is a fully available 10 × 8 matrix, packaged on one printed wiring card. FIG. 4 shows that a B unit (10 × 8) is a fully available matrix fabricated on one B card. The selector matrix B stage consists of 60 such B cards (60 B units).

The A matrix unit has five inlets and ten outlets. The B matrix unit has 10 inlets and eight outlets. Each A matrix unit is cross-connected to each B matrix unit. For example, from the illustration, it can be seen that each outlet of A unit 1 goes to the first inlet of each B unit. The pattern of this cross-connection scheme can be visualized by the following statement: A unit X, outlet Y is cross-connected to B unit Y, inlet X. These cross-connections between the A and B units are called AB links.

As shown in FIG. 4, each group of 10 A matrix units is cross-connected by AB links to ten B matrix units. A group of ten A matrix units cross-connected to ten B matrix units is called an AB group. The selector matrix may contain a maximum of six AB groups SAB1–SAB6, each of which has 50 inlets and 80 outlets. Thus, the AB groups provide an expansion matrix for mixing the traffic from 300 inlets and distributing this traffic to the various inlets of the C stage. An expansion from a single A stage inlet to the C stage outlets is shown on FIG. 5.

The C stage provides a further expansion matrix for distributing the traffic to a maximum of 800 outlets.

The C group is an expansion stage consisting of 80 C matrix units (6 × 10) SC1–SC80. The C group provides for 480 inlets and 800 outlets. Each C unit is a fully available 6 × 10 matrix, packaged on one printed wiring card. FIG. 4 shows that a C unit (6 × 10) is a fully available matrix fabricated on one C card. The C group consists of 80 such C cards.

A selector group always requires one AB group and one C group as a minimum of equipment. These equipments will provide for 50 selector group inlets and 800 outlets. By adding AB groups the number of inlets can be expanded in increments of 50 inlets.

As shown in FIG. 4 the set of 80 outlets formed by taking a given outlet (1 to 10) from each of the 80 C matrix units is the maximum number of outlet groups (or horizontals) that can be formed. The set of 10 outlets formed by taking a given outlet (1 to 10) from each of 10 adjacent C matrix units 11–10, 21–20, 31–30, 41–40, 51–50, 61–60, 71–70 or 81–80 is the minimum number of outlet groups or arrays that can be formed.

Intermediate size outlet groups can be formed by combining several outlet groups to form outlet groups of 20, 30, 40, 50, 60 and 70 outlets.

MARKER GROUP

The terminating marker as a subsystem of the EAX switching system functions to control the termination of a call. On command from the data processor unit the terminating marker terminates a call to a local line by selecting a terminating path through the selector matrix A, B, and C stages, a terminating junctor, and a line matrix C, B and A stages to the called party. In the event the call is not terminated at a local line, but is destined for an outgoing trunk, the terminating marker controls the selection of the terminating path through the selector matrix A, B, and C stages to an outgoing trunk. Terminating markers are provided in pairs. A pair of terminating markers is designed to serve up to eight selector groups. Each selector group contains one selector matrix consisting of an A, B, and C stage and the associate connect and access circuitry. This same pair of terminating markers is also designed to handle up to ten line groups. Each line group also includes one line matrix consisting of A, B, C and R stages, originating junctors, terminating junctors, connect and access circuitry and line equipment. One of the markers of a pair is selected for each termination but the two markers are not operated simultaneously. In case of a marker fault, the alternate marker can handle the entire traffic load. As shown in FIG. 1, the terminating marker interfaces with the selector and line matrices through the access and connect circuitry associated with the selector and line matrices. The marker uses the access and connect circuitry to supervise and control the matrices when setting up a terminating path. Said terminating marker interfaces with its companion marker to provide clock interlock control which prevents simultaneous connection of both markers to the same line or selector matrix. The terminating marker interfaces with the originating marker to provide reserve bus and busy bus checks which guard against originating marker or terminating marker double connections to a line matrix. The terminating marker interfaces with the data processor unit via communication links, to provide for communication between these subsystems. The terminating marker is divided into six functional circuit groupings; five of these consist of electronic logic. The sixth circuit group is comprised of the interface circuitry. The circuit groups comprising the terminating marker are as follows: inlet control, outlet control, maintenance and supervisory, sequence control, hand communication transceiver.

INLET CONTROL

Figures 6, 7:
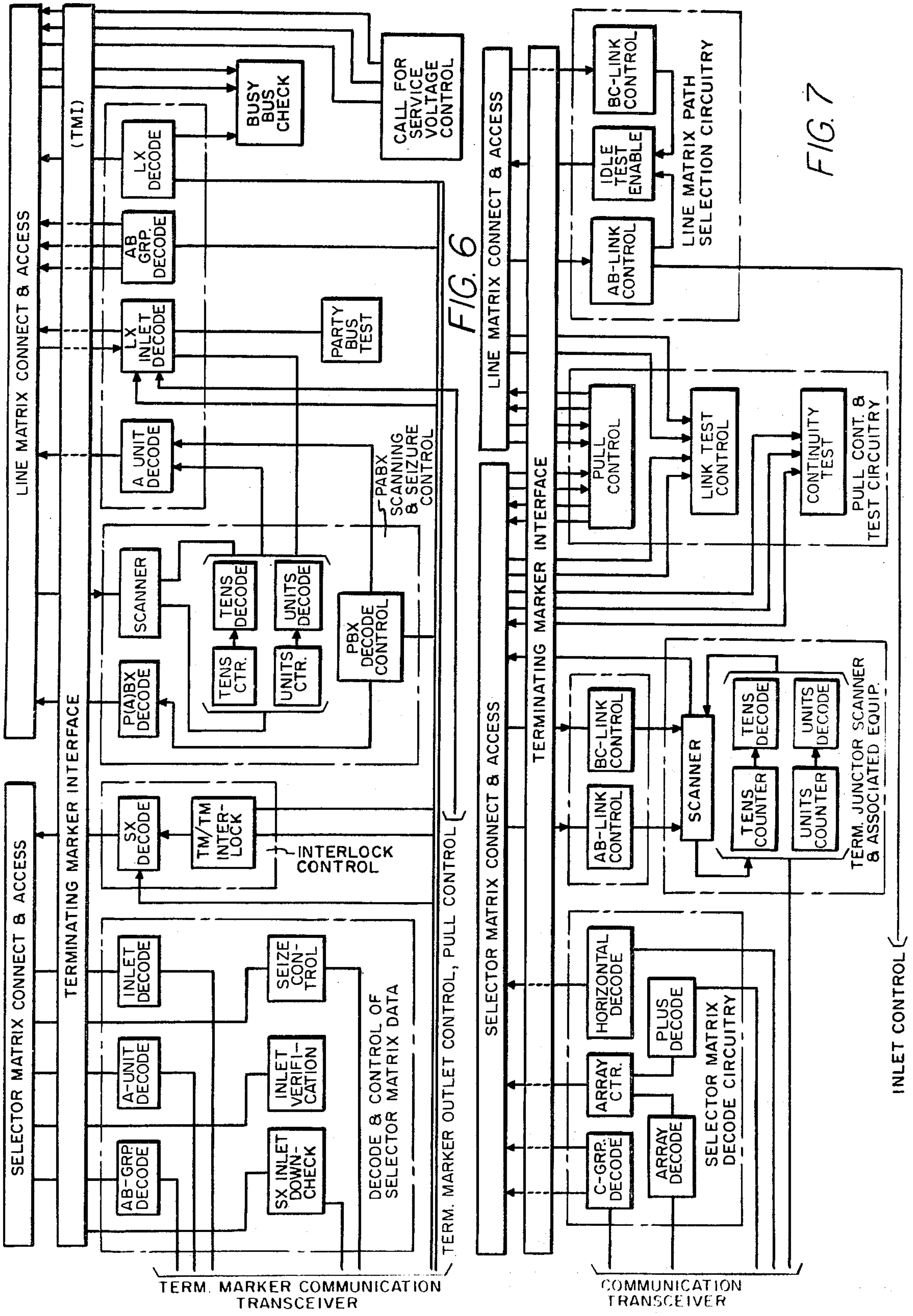
FIG. 6 is a functional block diagram of the marker inlet control circuits.
FIG. 7 is a functional block diagram of the marker outlet control circuits.

The main functions of the inlet control FIG. 6 are to decode the selector and line matrix information received from the terminating marker's communication transceiver, and to mark the pull conductor on the inlet side of the network; the terminating marker's inlet control circuit does not provide a scanning function, except for PABX calls, since selected matrix inlet identification is provided through direct communication with the data processor. If the call is to terminate locally the inlet control circuit checks to determine if the called line is busy. Functionally the inlet control circuit in the terminating marker consists of logic circuitry to accomplish the following: decode and control line and selector matrix data; permit busy bus testing; provide interlock control of terminating markers; make a party busy test on the line matrix; call-for-service voltage enable; PABX scanning; and control seizure of terminating junctors.

The interlock control logic prevents both terminating markers from working simultaneously. This also serves as a double check of the data processor unit since the data processor is programmed to work the terminating markers on an alternate basis.

The call-for-service voltage control logic is used to prevent another party from generating a call for service in the line matrix working with the terminating marker. This restriction prevails until the terminating marker finishes with the call.

The PABX scanner logic is used to find the PABX inlet on a line matrix A unit for a PBX call terminating locally. The tens and units counters are used to store the A units inlet identity.

The selector matrix data decode and control logic is used to interpret selector matrix data upon its arrival from the data processor unit in the shift register of the marker's communication transceiver. The data is required by the marker in order to select the proper path through the selector matrix.

The line matrix data decode and control logic is used to interpret line matrix data upon its arrival in the shift register of the marker's communication transceiver. This data is required by the marker in order to select the proper path through the line matrix.

The busy bus check logic is used to determine if an originating marker is working in the line matrix in which the terminating marker is going to work. If an originating marker is working in the line matrix, the terminating marker will mark a reserve bus of the line matrix. This prevents another originating marker from accessing the line matrix.

The party busy test circuitry tests the line matrix A unit inlet of the called party for busy. If the called party is busy, the terminating marker will so inform the data processor unit, via the communication transceiver. The data processor unit then causes the register sender to return busy tone to the calling party.

The seize control logic is used to seize an idle terminating junctor. This junctor becomes part of the terminating path selected through the line and selector matrix by the terminating marker.

The outlet control circuit functions to select a path through the selector matrix to an idle trunk or junctor if the call is not terminating at a local line. If the call is terminating at a local line, the outlet control circuit selects a path through the selector matrix to an idle terminating junctor and also selects a path through the line matrix between the called line and the same idle terminating junctor. In this way the terminating transmission path is established through the selector matrix, terminating junctor, and line matrix on a call to a local line. Functionally the outlet control is comprised of a selector matrix decode circuitry, selector matrix path selection circuitry, line matrix path selection circuitry, full control and test circuitry, and terminating junctor scanner with its associated equipment.

The selector matrix decode circuitry decodes selector matrix outlet data received from the data processor unit via the markers indication transceiver. This data permits the outlet control circuit to locate the correct horizontal and array within the selector matrix.

The selector matrix path selection circuitry provides for selector matrix AB1ink and BC link selection. AB link control circuitry finds an idle link between an A unit and the B unit. BC links control circuitry finds an idle link between the B unit and the C unit containing the outlet identified by the selector matrix decode circuitry described previously.

The line matrix path selection circuitry provides for line matrix AB link and BC link selection. AB link control circuitry finds an idle link between an A unit, which contains the called party's inlet, and a B unit. BC link control circuitry finds an idle link between a B unit and a C unit.

The pull control and the test circuitry is used for pulling the path through the line and selector matrix. In addition, it provides for testing this path for any malfunction.

The scanner and its associated equipment are used to locate an idle terminating junctor by scanning the idle test leads of the terminating junctors associated with the C unit outlets of a selector matrix. Upon finding an idle terminating junctor, the outlet control circuitry connects the selector matrix to the line matrix through the terminating junctor. The tens counter is used to store the identity of the array and units counter used to store the identity of the C card.

MAINTENANCE SUPERVISORY CIRCUITS

The maintenance and supervisory circuitry monitors the operation of the terminating marker from the time a matrix assignment is made until the marker completes its cycle of operation.

SEQUENCE CONTROL

The terminating marker sequence control circuit provides central control of all the processes performed by the marker. It also contains the clock pulse generating circuitry for the marker.

COMMUNICATION TRANSCEIVER

The communication transceiver receives a call-for-service indication from the data processor unit. This call-for-service indication tells the communication transceiver that data from the data processor unit is about to be sent to the communication transceiver. This data consists of four data frames. These data frames provide the terminating marker with the identity of the selector group inlet to be serviced and the identity of the selector group outlets connected to the correct junctor or trunk circuit group. Also, this data includes any information that pertains to this call to be loaded into these junctors or trunk circuits. If the call is to a line group, the data also includes the line to which the call is to be terminated. At the end of the marker's call processing cycle, the terminating marker's communication transceiver returns the data frame to the data processor unit. This data frame contains the above information along with the exact junctor or trunk circuit chosen by the terminating marker to complete the connection.

Functionally the communication transceiver contains a 4-word communication register, communication register control and control board, binary counter and decode logic, parity and shift check logic and status repeat code and end code logic.

The 4-word communication shift register makes up the majority of the communication transceiver. This communication register consists of four 25-bit shift registers which convert incoming serial data into parallel data and converts parallel data into outgoing serial data.

INTERFACE CIRCUIT

The terminating marker supervises and controls the operation of the selector and line matrix of the switching network in the process of terminating a call. To accomplish this function, marker interface circuit converts the electronic logic signals to voltages capable of driving network correed, relays and relay drivers. Conversely, the operation of certain marker logic circuitry is controlled by signals derived from the operation of network correeds, relays, or other electromechanical components. Thus, the interface circuits in the terminating marker provide a means for compatible transfer of information between electronic logic circuitry in the marker and electromechanical circuitry in the network.

MARKER CALL PROCESSING

The block of information received from the data processor unit contains the selector group inlet information associated with the calling party, such as selector matrix, selector AB group, selector A unit, and selector A unit inlet. Also, this block of information contains selector group outlet information associated with the local called party or outgoing destination such as horizontal, C group, array, plus bight, and sequential scan. If the call is to terminate at a local line, the block of information will include the identity of the line matrix, line AB group, line A unit, and line A unit inlet associated with the called party. If the call is to an outgoing trunk, the block of information will identify the selector outlet associated with the appropriate outgoing trunk. Acting on the block of information received from the data processor unit, the terminating marker completes the call to a local line by establishing a path through the selector matrix, an idle terminating junctor, and through the line matrix to the local line. Similarly, on an outgoing call, the terminating marker establishes a path through the selector matrix to an outgoing trunk circuit.

TERMINATING PATH SELECTION

The terminating marker has to be in an idle state in order to receive a call for service from the data processor unit. The data processor unit determines which terminating marker is idle and able to serve a call, then transmits a call for service to the chosen marker.

The data processor will send to the terminating marker via the marker's communication transceiver a block of information consisting of the instruction and data needed for the call to be established. The terminating marker decodes this block of information to determine whether the call is to an outgoing trunk or whether the call shall be extended to a line group through a local line.

If the call is an outgoing call, the marker operates the appropriate access circuitry to connect the marker to one of eight selector matrices in the selector group. After the access group has been operated, an appropriate selector connect equipment is operated to connect the AB group, the A card, the A unit inlet and the outlet group to the marker. Checks are made to insure there is a good connection between the terminating marker and selector matrix. Once the terminating marker establishes a connection to the appropriate selector matrix through the connect and access circuitry, the terminating marker will select a path through the selector matrix. The terminating marker will then perform all the path checks on this path to insure a proper circuit after which the circuit is pulled and foreign potential checks are made. This completes a signaling and a talking path from the correct A unit inlet to the correct C unit outlet which is associated with the proper outgoing trunk circuit. The terminating marker sends path identity data to the data processor unit, then releases from selector matrix, by restoring the connect and access circuitry. The terminating marker returns to idle and is ready to be assigned another call by the data processor unit.

If the call is to a local line, the marker tests the appropriate line matrix to determine if an originating marker has already accessed it. When the terminating marker determines that the line matrix is idle, it makes this line matrix busy to prevent one of the originating markers from accessing this line matrix. As indicated the terminating marker operates selector and line access equipment to gain access to the appropriate selector group and line group. A check is made to assure correct access. The terminating marker then operates line and selector connect equipment to connect itself to the line group, AB group, A card, A unit inlet, and terminating junctor group. The marker checks the access and connect circuitry to assure a correct connection. The line group AB links and the line group A unit inlet are checked for busy. This information as to the relays to be operated to reach the proper terminal is contained in the data received from the central processor to the marker communication transceiver. This information also includes information necessary to connect to the five line matrix AB links available to this line terminal. The twenty BC links available to the AB links are also connected according to the data received from the data processor unit.

Figure 8:
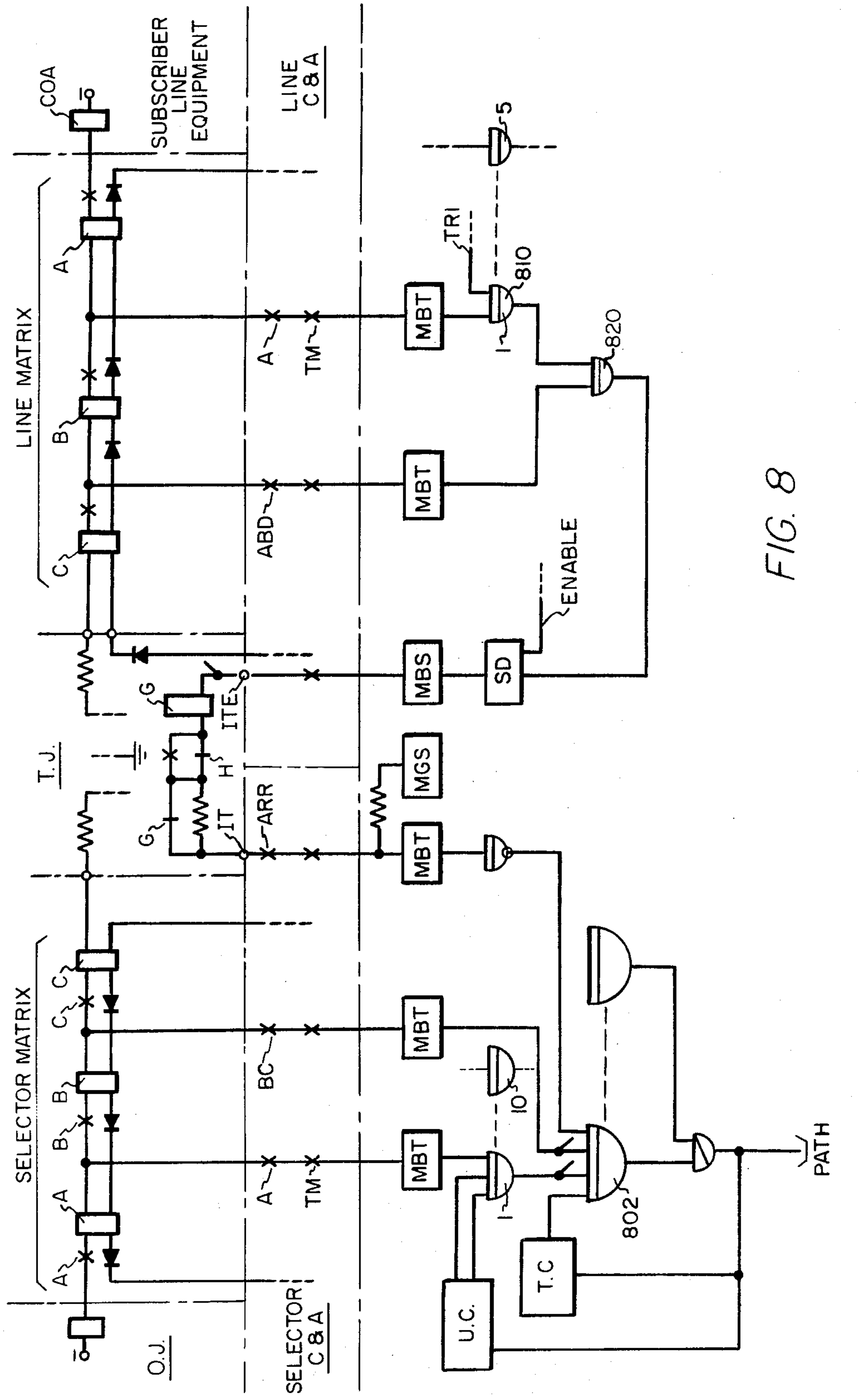
FIG. 8 is an abbreviated diagram showing the selector and line matrix crosspoints with simplified path selection logic.

Each of the leads from the five AB link hold conductors are taken through the connect and access circuits to one of five AND gates such as 810 along with an enabling lead TR1 from the transceiver, see FIG. 8. The output of each of these gates is connected to four AND gates 820 out of a total of 20 corresponding to the four BC links available to each of the AB links. The outputs of these 20 gates are each connected to a battery switch each corresponding to a group of 6 terminating junctors. Therefore each terminating junctor of the group to which there is a path available from the selected line terminal has a battery potential applied to its idle test enabling lead. If the junctor is idle this potential is passed through it via the G relay and its associated contacts to the idle test lead of the selector path testing circuit. If the called line is busy and a connection can not be made, the connect and access circuit paths established are dropped, and a data frame is sent to the data processor unit for the terminating marker. As a result, the busy signal is returned to the calling party.

If the A unit inlet in the line group is idle and the access and connect circuitry from the marker to both the line group and selector group is complete, a scan is made for an idle path through the selector group to the common group of terminating junctors associated with the idle path through the line group.

Figure 5:
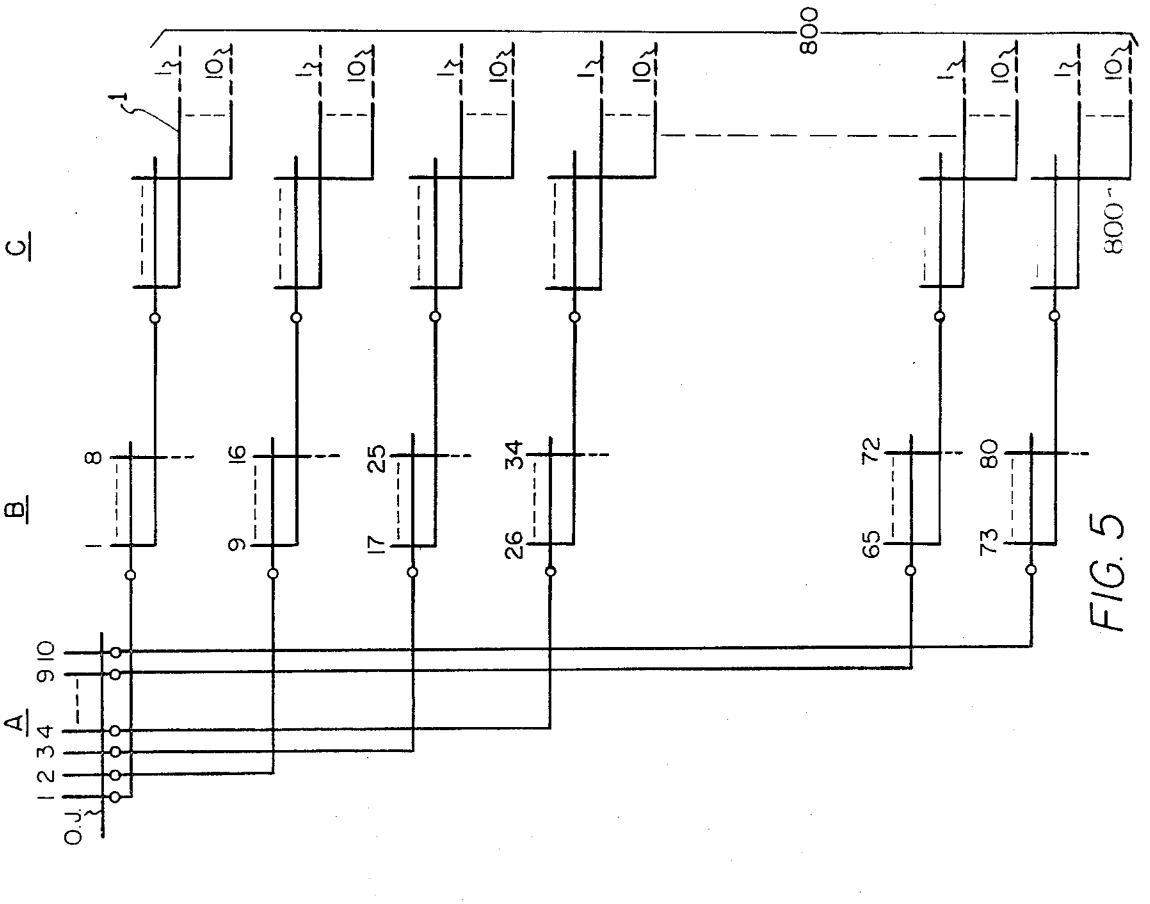
FIG. 5 shows the fan out of the links from a single selector inlet.

Starting with the originating junctor to which the calling line is connected, this information is provided the marker by the data processor, the connect and access circuits are operated by the inlet control to connect ten AB links of the selector matrix to the marker outlet control. These ten links are the AB links available to the originating junctor OJ as outlets of the A matrix horizontal to which the originating junctor is connected as illustrated by FIGS. 5 and 8. The ten hold leads corresponding to the 10 links are each taken to an AND gate corresponding to gate 801, to which are also connected two other inputs, one from a units counter and one from a units latch.

Referring to FIG. 5 it can be seen that these ten AB links fan out into 80 potentially available BC links. These 80 leads from the hold conductor are each taken to an AND gate corresponding to gate 802. These 80 gates may be visualized as 10 groups of 8 gates, then each group of 8 gates corresponds to and has connected in multiple thereto as an input a lead corresponding to one of the 10 AB links associated therewith. Also, each gate of each group has one input corresponding to the 10 counter outputs 1 through 8. One other input to each of the 80 gates is the idle test output IT from the terminating junctors through which a called line may be reached, only 80 are tested at a time. The result of these link connections is that as the tens scanner enables a group of 10 gates, the units scanner will look at each of these gates in succession. Then if the gate enabled by both the units and tens scanner also has an available AB link, an available BC link, and an idle junctor, the output of the gate is passed through an OR gate to indicate a selector path found. This stops the scanners, and their status indicates the junctor selected. If the path selection through the line matrix is successful and the path selection to the selector matrix is successful, the C unit outlets associated with the selector matrix path are scanned. The scanning is performed in order to find an idle terminating junctor that is associated with the selected line matrix path. Once a path through the selector matrix, terminating junctor and line matrix is found, multiple path checks are made in the line and selector matrices to insure the path selected through the matrices is good. The circuit is pulled and foreign potential checks are made, and a talking path is established. Necessary data concerning the established path is sent to the data processor unit via the terminating marker's communication transceiver. The terminating marker disconnects from the line and selector matrices are releasing the associated connect and access equipment. The terminating marker returns to its idle state and is ready to process other calls. In either type of call, trunk or local, the terminating marker releases the path through the connect and access circuitry and tests for correct release of the connect and access equipment. Since the line matrix was made busy on a call to a local line it is now idle to other markers, both originating and terminating. The terminating marker's communication transceiver sends the identity of the path selected to the data processor unit.

TRACING A LOCAL CALL THROUGH THE SYSTEM

When a subscriber goes off-hook, the line loop is closed, causing the line correed of his line circuit to be operated. Refer to FIG. 1. Energizing the line correed places a call for service through the line matrix A, B, and C stages to the originating marker. This is accomplished by marking the inlet pull lead with resistance battery, via the break contacts of the call for-service correed and the make contacts of the line correed. Reference may be had to U.S. Pat. No. 3,211,837 for a detailed description of the line identifier.

The originating marker assigners are sequentially scanning line and trunk matrices. They sense the resistance battery on the outlet pull leads of the selected line matrix C units and begin to set up the call. One of the two markers will be assigned to the call when the line matrix number coincides with the scanner count, provided one of the markers is idle, the selected line matrix has no marker presently assigned to it, and no terminating marker is waiting for this matrix.

The assigned originating marker connects to the line matrix by operating marker dedicated access correeds in the line matrix. These correeds attach the marker to the matrix group in order to allow the necessary marker-matrix communication for the processing of the call to take place. It then attempts to set up the call by connecting the subscriber's line through the line matrix to an idle originating junctor OJ and an idle register junctor RJ. The cycle time is in milliseconds. The marker scans the inlet pull leads of the selected C unit in the line matrix to identify the AB group (200 lines, see FIG. 2) from which the call originated. The marker then operates connect correeds which access the identified AB group. The A unit (20 lines) is identified in the same manner, except that the B unit inlets are scanned, and the marker then operates the connect correeds corresponding to the identified A unit. A scan of the inlet P leads of the A unit identifies the line calling for service.

From the inlet identity, the marker determines which AB links are accessible from this inlet and tests these links for busy. All outlets of B units connecting to unaccessible or busy AB links are electronically inhibited from route selection. The marker then determines if all register junctors connected to any R unit are busy and electronically inhibits the associated B unit outlets from route selection.

The remaining B unit outlets constitute idle links to originating junctors. The marker selects one of these links by scanning until it detects an idle link. The marker then scans the outlets of the R unit defined by the B unit outlet, and makes a register junctor selection.

At this point, the marker has identified the calling line number (line matrix number, AB group number, A unit, and A unit inlet), and has preselected an idle path identified in terms of the B unit, B unit outlet, and R unit outlet. This information is loaded into the marker communication register and sent to the data processor unit via its communication transceiver.

While sending the line number identity and route data to the data processor, the marker operates connect correeds which provide access to the selected B unit and R unit outlets. These outlets and the inlet calling for service define a unique matrix path from inlet to register junctor. The path is tested dynamically for the existence of multiple crosspoints. The A, B, and R crosspoints are pulled. A temporary hold is applied by the marker to the hold lead at the R matrix outlet and the path is tested for foreign potentials. The marker hold is repeated by the originating junctor, operating the subscriber's line circuit cutoff correeds. This removes the line correed from the line loop and busies the inlet to terminating calls. The pull is then removed to check the ability of the network to hold.

The marker operates the register junctor hold correed, which connects the register junctor pulsing relay to the loop. The hold correed provides a hold potential for the path and the marker's temporary hold is removed. The subscriber's loop seizes the register junctor pulsing correed. The pulsing correed operates indicating presence of a pulsing highway to the register controller of the register-sender. Upon detecting the pulsing highway, the register sets up a hold in the register junctor. The marker, after observing that the register junctor is busy and the network is holding, disconnects itself from the matrix. The entire marker operation takes a few milliseconds.

The data processor unit, upon being informed of a call origination, enters the originating phase. The originating phase is one of the three major phases of the call processing function, and can best be defined as all program functions that are performed from the time the originating marker informs the data processor of an originating call until the register-sender is initialized to receive the incoming digital information.

As previously stated, the block of information sent by the marker includes the equipment identity of the originator, originating junctor and register junctor, plus control and status information. The control and status information is used by the data processor control program in selecting the proper function to be performed on the data frame.

The data processor analyzes the data frame sent to it and from it determines the register junctor identity. A register junctor translation is required because there is no direct relationship between the register junctor identity as found by the marker and the actual register junctor identity. The register junctor number specifies a unique cell of storage in the memory.

Once the register junctor identity is known, the data is stored in the data processor's call history table and the register sender is notified that an origination has been processed to the specified register junctor.

Following the register junctor translation, the data processor performs a class-of-service translation. The class-of-service translation is needed because different inlets on the line matrix require different services by the system. Included in the class-of-service is information concerning dial tone, party test, coin test, type of ready-to-receive signaling required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register junctor translation, and consists of retrieving from the memory the originating class-of-service data keyed on the originator's line number identity. Part of the class-of-service information is stored in the call history table in the data processor unit and part of it is transferred to the register-sender where it is used to control the register junctor.

Before the transfer of data to the register-sender memory takes place, the class-of-service information is first analyzed to see if special action is required (e.g., non-dial line or blocked originations). The register junctor is informed of any special services the call it is handling must have. This is accomplished by the data processor loading the results of the class-of-service translation into the register-sender memory words associated with the register junctor.

The register junctor returns dial tone and the customer proceeds to key touch calling telephone sets or dial the directory number of the desired party.

The register junctor pulse repeating correed follows the incoming pulses (dial pulse call assumed), and repeats them to the register-sender central control circuit via a lead multiplex. The accumulated digits are stored in the register-sender memory.

In this example, a local line without special features is assumed. The register-sender requests a translation after collecting the first three digits. At this point, the data processor enters the second major phase of the call processing function the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described, the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. The data processor initiates a request to the memory system for a look-up of the local directory number table (terminating lists) to provide the line equipment number of the called line and terminating class-of-service of the called line (including ringing code and special features). Grouping digits (selector outlet arrays) for the terminating junctors are obtained from a memory table look-up keyed on the terminating line matrix. The data processor also requests the memory system to determine the selector matrix inlet identity. This information is assembled in the dedicated call history table in the data processor memory. Control is transferred to the terminating process phase. The digit analysis phase is complete.

The terminating process phase is the final major phase of the call processing function. Sufficient information is gathered to instruct the terminating marker to establish a path from the selector matrix inlet to either a terminating local line (this example) or a trunk group. See FIG. 1. This information plus control information (e.g. ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the operation as the data frame is sent to the terminating marker. The call is forwarded to the called party, and the call is terminated.

A check is made of the idle state of the data processor communication register, and a terminating marker. If both are idle, the data processor writes into the register-sender memory that this register is working with a terminating marker. All routing information is then loaded into the communication register and sent to the terminating marker in a serial communication.

The terminating marker decodes the line matrix specified for line termination, determines that the matrix is idle (no originating marker processing it) and assigns itself to the matrix. The terminating marker connects to the specified line and selector matrices by operating dedicated access correeds in the respective matrices. It then operates connect correeds accessing the selector inlet, selector AB and BC links, line AB and BC links, and the line circuit of the called line.

The marker checks the called line to see if it is idle. If it is idle, the marker continues its operations. These operations include the pulling and holding of a connection from the originating junctor to the called line via the selector matrix, a terminating junctor, and the line matrix. While controlling the path, the marker makes a series of checks to monitor the proper operation of the matrices, e.g., links are tested for busy, paths are pulled and checked for foreign potentials, and the complete path from selector inlet to line circuit is checked for continuity.

When the operation of the matrices has been verified by the marker, it informs the data processor of the identity of the path and that the connection has been established. The marker then releases from the path. The data processor recognizes from the terminating class that no further extension of this call is required. It then addresses the register-sender memory with instructions to switch the originating path through the originating junctor.

The register junctor signals the originating junctor to switch through and disconnects from the path, releasing the R matrix. The originating junctor remains held by the terminating junctor via the selector matrix. The register-sender clears its associated memory and releases itself from the call.

The calling party, now connected to the terminating junctor, loop seizes the battery-feed correed. The terminating junctor splits the transmission path and connects ringing current to the called line and ring-back tone to the calling line. When the called party answers, a closed loop is detected by the ring-trip circuit of the terminating junctor which removes ringing and ring-back tone from the line. The transmission path is completed and transmission battery is provided to both calling and called parties.

When the parties are through talking and hang up, the terminating junctor releases the terminating line matrix and the selector matrix. Release of the selector matrix releases the originating junctor which releases the originating line matrix. The cut-off correeds of both line circuits release, and the subscriber's line circuits are idled for future calls.

What is claimed is:

1. Marker apparatus for a communication switching system to select paths and establish connections between a first set of terminals and a second set of terminals through a first plurality of switching stages via an intermediate junctor and a second plurality of switching stages arranged in tandem between terminals of the first set and terminals of the second set, each of said stages comprising a plurality of relays arranged in coordinate arrays, at the coordinate points of each of said arrays, each relay having a normally open set of its own contacts connected in series with its hold winding, there being links interconnecting adjacent stages, a hold conductor interconnecting the series combination of the hold winding and normally open contacts of a relay in each of the adjacent stages, busy links having the hold path contacts closed at each end and having holding current flowing through the hold windings so that a given potential appears on the hold conductor; said marker apparatus comprising an arrangement for selecting a group of possible links via said second plurality of switching stages for a given connection of said second set of terminals to said intermediate junctors and for connecting the hold conductors thereof to individual inputs of a detecting arrangement, first means in the detecting arrangement to distinguish between the circuit conditions on an idle link and the said potential on a busy link conductor, combinational logic gates operated responsive to a non-busy condition of the links in a path from a terminal for said given connection to available junctors for applying a test potential to said junctors, means in said junctors effective in an idle condition thereof to pass said test potential through to a test terminal, said marker apparatus further comprising a second arrangement for selecting a group of possible links via said first plurality of switching stages for a given connection and for connecting the hold conductors thereof and said junctor test terminals to individual inputs of a detecting arrangement, means in the detecting arrangement to distinguish between the circuit condition on an idle link and the said potential on a busy link hold conductor, a route selector comprising a scanning arrangement having counting means and coincidence checking means, with connections from the counting means and the detecting arrangement to the coincidence checking means, means to produce a path-found signal from the coincidence checking means responsive to the counting means being in a position corresponding to a path via idle links and an available junctor as indicated by the presence of a test potential on said test terminal.

2. Marker apparatus as claimed in claim 1, which includes an arrangement for identifying one terminal of the second set, and an arrangement for defining a group of junctors through which a given connection may be established; wherein each of said stages comprises a plurality of coordinate matrices, with any terminal of the second set connectable through one matrix of a first stage to M first-second stage links extending to M different matrices of a second stage, with each of these M links connectable through the second stage to N second-third stage links so that any terminal of the second set is connectable to M X N second-third stage links, each of which extends to a different third stage matrix, each terminal of said defined group of junctors being associated with a different one of the third-stage matrices and connectable through it to one of these second-third stage links; means to connect the hold conductors of the M first-second stage links which are connectable to the identified terminal of the second set to individual detector-arrangement inputs, means responsive to the detection of a busy first-second stage link to apply a potential to the hold conductors of the N second-third stage links connectable thereto which is equivalent to the potential on a busy second-third stage link hold conductor, to thereby block the selection of a path including one of these links.

3. Marker apparatus as claimed in claim 2, wherein said coincidence checking means comprises a number of coincidence gates equal to the number of terminals in said defined group of intermediate junctors, each gate having an input which shows the busy idle state of one terminal of the defined group, one input which shows the availability of the corresponding second-third stage link and an input for a corresponding stage of the counting means, means including a source of pulses to step the counting means to thereby enable the coincidence gates in turn one at a time until coincidence is found to generate said path-found signal, means responsive to the path-found signal to stop the counting means so that the position of the counting means corresponds to the path found.

4. Marker apparatus as claimed in claim 3 further including means for applying a first marking potential to the terminal of the first set and the terminal of the second set and a second marking potential to the terminals of the junctor of the selected path which produces a potential difference in the forward direction of said unidirectional devices between the two selected terminals and said junctors through a series path including the operate winding of one coordinate point relay of each of said stages, which causes said relays in the path between the selected terminals to operate and thereby establish a communication path, a holding circuit being then completed in series through the hold windings and said series contacts of the relays in the established path, and means effective subsequent to the establishment of the holding path for removing said marking potentials and thereby open the operate circuit.

5. Marker apparatus as claimed in claim 1, wherein the number of stages between the first set of terminals and the terminating junctors is three.

6. Marker apparatus as claimed in claim 1, wherein the number of stages between the second set of terminals and the terminating junctors is three.

7. Marker apparatus as claimed in claim 1 wherein said links between said first plurality of switching stages and said junctors includes a distributing arrangement.

* * * * *